(12) United States Patent
Cacenco et al.

(10) Patent No.: US 7,613,789 B2
(45) Date of Patent: Nov. 3, 2009

(54) DEVELOPMENT TOOL AND METHOD FOR AUTOMATING DETECTION AND CONSTRUCTION OF NOTIFICATION-BASED COMPONENT APPLICATIONS

(75) Inventors: Michael Cacenco, Brampton (CA); Bryan Goring, Milton (CA); Michael Shenfield, Richmond Hill (CA); Viera Bibr, Kilbride (CA)

(73) Assignee: Research In Motion Limited, Waterloo (CA)

( * ) Notice: Subject to any disclaimer, the term of this patent is extended or adjusted under 35 U.S.C. 154(b) by 630 days.

(21) Appl. No.: 11/405,495

(22) Filed: Apr. 18, 2006

(65) Prior Publication Data

US 2006/0253834 A1 Nov. 9, 2006

Related U.S. Application Data

(60) Provisional application No. 60/672,078, filed on Apr. 18, 2005.

(51) Int. Cl.
*G06F 15/16* (2006.01)
(52) U.S. Cl. ........................... 709/218; 717/107
(58) Field of Classification Search ......... 709/200–203, 709/217–227; 717/107
See application file for complete search history.

(56) References Cited

U.S. PATENT DOCUMENTS

| 2005/0261923 | A1* | 11/2005 | Brown et al. | 705/1 |
| 2006/0004856 | A1* | 1/2006 | Shen et al. | 707/103 Y |
| 2007/0204279 | A1* | 8/2007 | Warshavsky et al. | 719/330 |

OTHER PUBLICATIONS

PCT International Search Report and Written Opinion dated Aug. 14, 2006 for corresponding PCT Application No. PCT/CA2006/000616.
Oberleitner, J. et al. "Constructing Web Services out of Generic Component Compositions," Sep. 23, 2003, whole document.
Balsoy, O. et al, "Automating Metadata Web Service Deployment for Problem Solving Environments", Australia, 2003, whole document.
Pallickara, S. et al, "An Analysis of Notification Related Specifications for Web/Grid Applications", Apr. 4-6, 2005, whole document.
Govindaraju, M. et al, "Merging the CCA Component Model with the OSGI Framework", May 12-15, 2003, whole document.
Endrei, M. et al "Patterns: Self-Service Application Solutions Using WebSphere V5.0", May 2003, pp. 112-130.

(Continued)

*Primary Examiner*—Moustafa M Meky
(74) *Attorney, Agent, or Firm*—Gowling LaFleur Henderson LLP

(57) ABSTRACT

A notification module is provided for executing in combination with an application design tool for facilitating generation of a component application. The notification module includes a program wizard configured to assist with the development of the component application. That is, the program wizard detects a notification from at least one message. Notification operations are created in accordance with the detected notification. Corresponding elements are constructed in accordance with the created notification operations. Lastly, a mapping document is created for correlating the at least one message with its corresponding constructed elements. The mapping document is for use at a gateway server to facilitate communication between the application and a corresponding backend server.

12 Claims, 5 Drawing Sheets

OTHER PUBLICATIONS

Office Action issued by the Canadian Intellectual Property Office dated Apr. 3, 2008 for corresponding Canadian Patent Application No. 2,605,118.

Office Action issued by the European Patent Office dated Nov. 27, 2007 for corresponding European Patent Application No. 06790510.9.

Extended European Search Report issued by the European Patent Office dated Dec. 11, 2008 for corresponding European Patent Application No. 06790510.9.

Examination Report issued by the European Patent Office dated Apr. 3, 2009 for corresponding European Patent Application No. 06790510.9.

* cited by examiner

DEVELOPMENT TOOL AND METHOD FOR AUTOMATING DETECTION AND CONSTRUCTION OF NOTIFICATION-BASED COMPONENT APPLICATIONS

The present invention relates generally to constructing applications for executing on a communication device, and specifically to a development tool and method for facilitating the incorporation of notification messages. This application claims priority from U.S. Provisional Application No. 60/672,078, which was filed Apr. 18, 2005.

BACKGROUND

There are continually increasing number of mobile communication devices in use today, including, for example, smart phones, personal digital assistants (PDAs) with wireless capabilities, personal computers, self-service kiosks and two-way pagers. Accordingly, software applications are being developed to execute on these devices and increase their utility. For example, a smart phone may include an application which retrieves the weather for a range of cities, or a PDA which may include an application that allows a user to shop for groceries. Such software applications take advantage of connectivity to a communication network in order to provide timely and useful services to users of the communication devices.

Generally, there are two broadly defined ways of transmitting data to a communication device. In a push system, data is transmitted, or pushed, to the user from a data source without requiring the user to explicitly request the data. In a pull system, data is transmitted, or pulled, from a data source in response to a specific request from the user. Further, hybrid systems exist that offer a combination of both the push and pull systems.

In order to implement a push system, a server is provided that, given a user's request to be notified with specific data on predefined conditions, transmits this data to the user's device as soon as the specific data is available and/or the predefined conditions have been met. Therefore, the onus is on program developers to ensure that the applications they are deploying are properly written so that such notifications can be properly implemented.

However, due to limited resources of many devices, as well as the complexity and expense required to deliver large amounts of data to the devices, developing and maintaining software applications tailored for a variety of devices remains a difficult and time-consuming task.

Further, with the proliferation of wireless communication devices, there is an increased demand to quickly develop client applications that support subscriptions and notifications. Currently, bandwidth costs and speed limitations of wireless communication devices make the use of notifications an attractive alternate to frequently polling a resource.

However, applications to be executed on communication devices that support notifications need to be developed manually. This type of application can be complex and require additional developer time and effort to adapt it to a notification network environment.

Accordingly, it is an objection to obviate or mitigate at least some of the above-presented disadvantages.

BRIEF DESCRIPTION OF THE DRAWINGS

An embodiment of the present invention will now be described by way of example only with reference to the following drawings in which.

DETAILED DESCRIPTION OF THE PREFERRED EMBODIMENT

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyright rights whatsoever.

In accordance with an embodiment there is provided a notification module for executing in combination with an application design tool for facilitating generation of a component application, the notification module comprising a program wizard configured to: detect a notification from at least one message; create notification operations in accordance with said detected notification; construct corresponding elements in accordance with said created notification operations; and create a mapping document in accordance with said created notification operations for correlating the at least one message with its corresponding constructed elements, the mapping document for use at a gateway server to facilitate communication between the application and a corresponding backend server.

Figure 1:
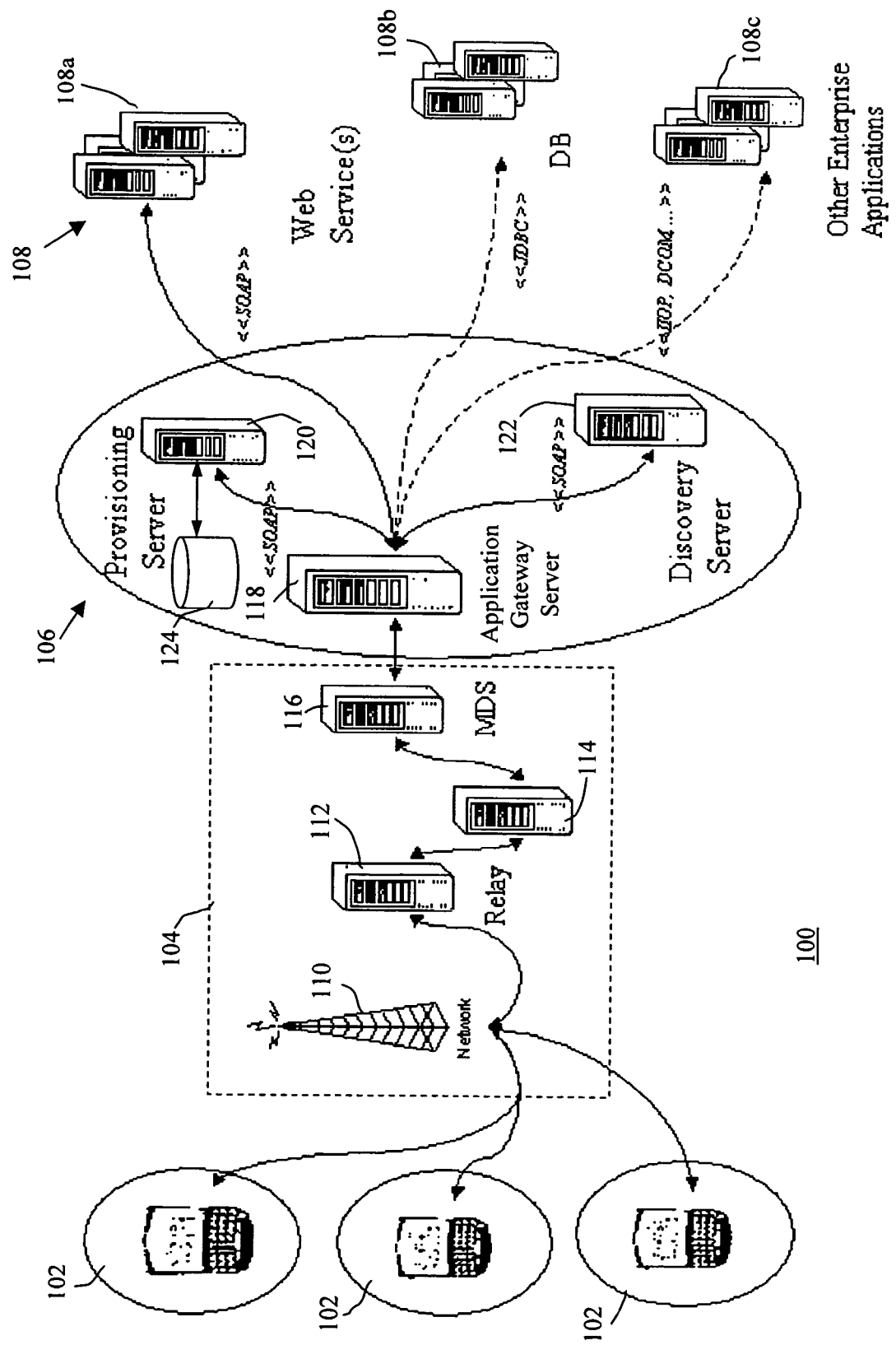
FIG. 1 is a block diagram of a communication network infrastructure.

For convenience, like numerals in the description refer to like structures in the drawings. Referring to FIG. 1, a communication infrastructure is illustrated generally by numeral 100. The communication infrastructure 100 comprises a plurality of communication devices 102, or simply devices 102, a communication network 104, an application gateway 106, an application development environment 107 and a plurality of backend servers 108.

The devices 102 include both wired and wireless computing devices such as a desktop computer, a laptop or other portable computer, a smart phone, a personal digital assistant (PDA), and the like. The devices 102 are in communication with the application gateway 106 via the communication network 104. Accordingly, the communication network 104 may include several components such as a wireless network 110, a relay 112, a corporate server 114 and/or a mobile data server 116 for relaying data between the devices 102 and the application gateway 106.

The application gateway 106 comprises a gateway server 118 a provisioning server 120, a discovery server 122 and a repository 124. The gateway server 118 is in communication with both the provisioning server 120 and the discovery server 122. The gateway server 110 is further in communication with a plurality of the backend servers 108, such as Web services 108a, database services 108b, as well as other enterprise services 108c, via a suitable link. For example, the gateway server 110 is connected with the Web services 108a and database services 108b via Simple Object Access Protocol (SOAP) and Java Database Connectivity (JDBC) respectively. Other types of backend servers 108 and their corresponding links will be apparent to a person of ordinary skill in the art. Accordingly, it can be seen that the gateway server 118 acts as a message broker between the devices 102 and the backend servers 108.

Each wireless device 102 is initially provisioned with a service book establishing various protocols and settings, including connectivity information for the corporate server 114 and/or the mobile data server 116. These parameters may include a Uniform Resource Locator (URL) for the application gateway server 118 as well as its encryption key. Alternatively, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Applications are provided for execution on the wireless devices 102. The applications are stored in a repository 124 as a series of packages, or bundles. The packages are typically created by an application developer using a design tool provided by the application development environment 107. The design tool provides support for a drag-and-drop graphical approach for visual design of application components including screens, data elements, messages and application workflow logic, as further defined below.

The application packages are represented as structured data (XML) that can be generated automatically by the design tool through an automatic code generation process. The design tool further enables the automatically-generated code to include, or be otherwise augmented by, an industry standard scripting language, such as JavaScript or another scripting/programming language known in the art.

The availability of application packages in the repository 124 is published in a registry via a discovery service provided by the discovery server 122. It is recognized that there can be more than one repository 124 and associated registries used by the gateway server 118.

Once again, the design tool is operated in an application development environment executing on a computer. The development methodology of the design tool can be based on a visual "drag and drop" system of building application models.

The design tool can be structured as a set of plug-ins to a generic integrated design environment (IDE) framework, such as, for example, the Eclipse™ framework. Alternatively, the tool can be configured as a complete design framework without using a plug-in architecture. For exemplary purposes only, the tool will now be described as a plug-in design environment using the Eclipse™ framework.

Figure 2:
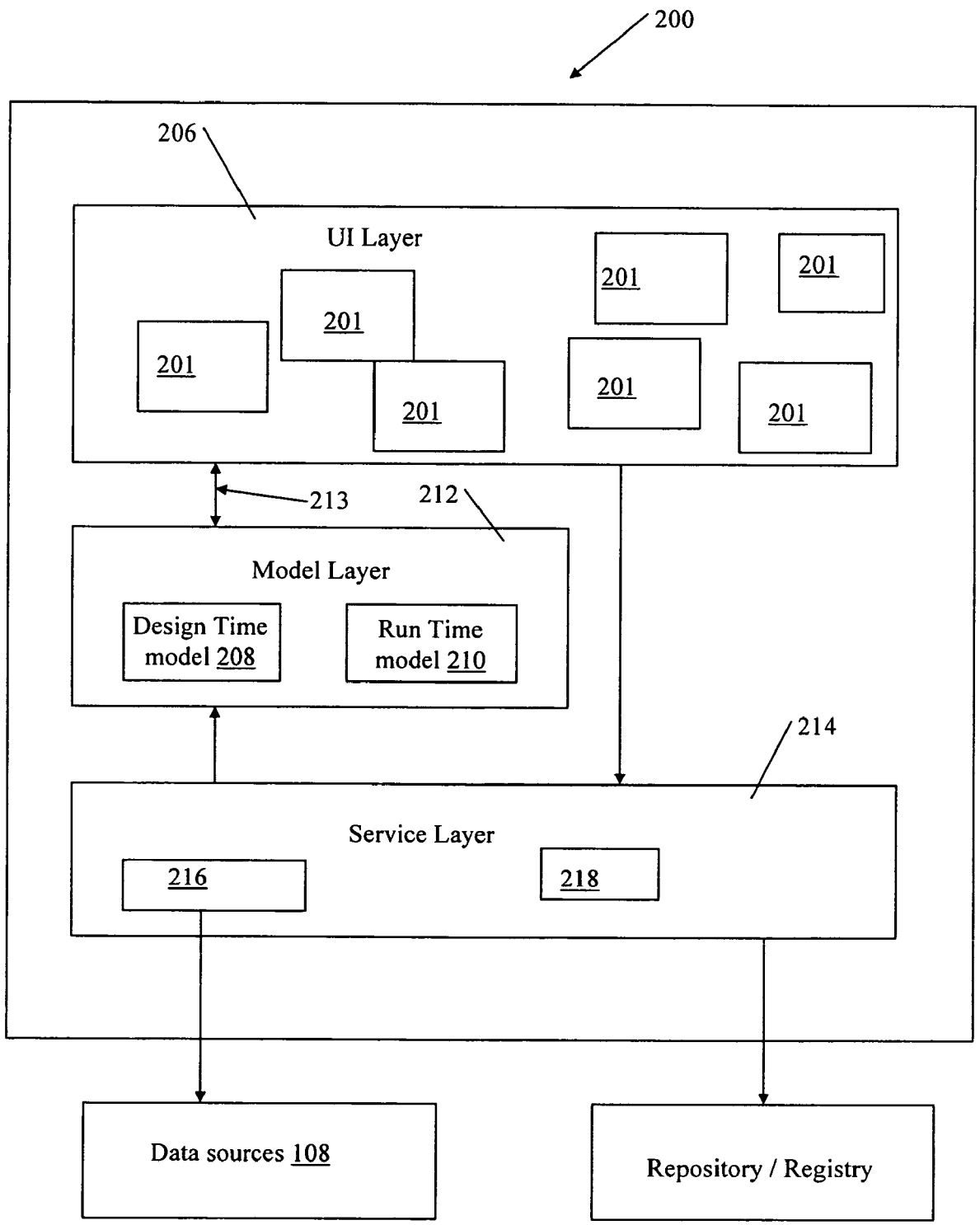
FIG. 2 is a block diagram illustrating a design tool architecture.

Referring to FIG. 2, an overall designer tool structure for designing component applications is illustrated generally by numeral 200. In the present embodiment, the designer tool is implemented using Eclipse™. Eclipse™ is designed to support the construction of a variety of tools for application development. Further, Eclipse™ supports an unrestricted set of tool providers, including independent software vendors (ISVs) as well as tools for manipulating arbitrary content types (for example HTML, Java, C, JSP, EJB, XML, and GIF). Eclipse™ supports both GUI and non-GUI-based application development environments.

Eclipse™'s principal role is to provide tool providers with mechanisms to use and rules to follow that lead to seamlessly-integrated tools. These mechanisms are exposed via well-defined application program interface (API) interfaces, classes, and methods. Eclipse™ also provides useful building blocks and frameworks that facilitate developing new tools.

Eclipse™ comprises a plug-in architecture, wherein a plug-in is the smallest unit that can be developed and delivered separately. Usually a small tool is written as a single plug-in, whereas a complex tool has its functionality split across several plug-ins. Plug-ins are coded in Java and a typical plug-in consists of Java code in a Java Archive (JAR) library, some read-only files, and other resources such as images, Web templates, message catalogs, native code libraries, and the like.

Each plug-in has a manifest file declaring its interconnections to other plug-ins. In order to define interconnections a plug-in declares any number of named extension points, and any number of extensions to one or more extension points in other plug-ins. Eclipse™ is a well-known environment, and these and other features are thoroughly described at www.Eclipse.org.

In the present embodiment, Eclipse™ is used to enable a developer to design a component application. A component application is an application defined generally by a structured set of components, including data components, message components, presentation components and workflow components. The components are defined using a structured language and executed on a client device by an intelligent runtime container.

The data components define data entities that are used by the component application program. Examples of data entities include orders, users, and financial transactions. Data components define what information is required to describe the data entities, and in what format the information is expressed. For example, the data component may define an order comprising a unique identifier for the order, which is formatted as a number; a list of items, which are formatted as strings; the time the order was created, which has a date-time format; the status of the order, which is formatted as a string; and a user who placed the order, which is formatted according to the definition of another one of the data components. Since data elements are usually transferred by message, there is often persistence of data components in a database. Data components may be dynamically generated or defined by the application designer.

The message components define the format of messages used by the component application program to communicate with external systems such as the Web service. For example, one of the message components may describe a message for placing an order, which includes a unique identifier for the order, a status of the order, and notes associated with the order.

The presentation components define the appearance and behaviour of the component application program as it displayed to a user via a user interface. The presentation components can specify graphical user interface (GUI) screens and controls and actions to be executed when the user interacts with the component application. For example, the presentation components may define screens, labels, edit boxes, buttons and menus, and actions to be taken when the user types in an edit box or pushes a button.

The workflow components of the component application program define processing that occurs when an action is to be performed, such as an action specified by a presentation component as described above, or an action to be performed when messages arrive. Presentation workflow and message processing are defined by the workflow components. The workflow components are written as a series of instructions in either structured data or a programming language or a scripting language. The workflow component supports a correlation between message components and defines application flow as a set of rules for operations on other components.

More details regarding component application can be found in Patent Cooperation Treaty Application Numbers PCT/CA2003/001976 entitled, "System and Method for Building and Execution of Platform-Neutral Generic Services Client Applications" and published as WO2004059938; PCT/CA2003/001980 entitled, "System and Method of Building Wireless Component Applications" and published as WO2004059957; and PCT/CA2003/001981 entitled, "System and Method of Creating and Communicating with Component Based Wireless Applications" and published as WO2004059939, each of which is assigned to the owner of the present application.

The designer tool 200 comprises a user interface (UI) layer 206, a model layer 212 and a service layer 214. The UI layer 206 primarily comprises a collection of user modules 201, including graphical and text editors, viewers and wizards. A large majority of external interactions are accomplished through one or more of these modules, with the developer using a system of drag and drop editing and wizard-driven interaction. A secondary, non-user-facing system interface is that of backend connector, whereby the designer tool 200 can communicate with various backend servers 106 such as Web Service providers and relational databases for example. As described above, designer the tool 200 can be built on the Eclipse™ platform. Accordingly, the user modules 201 are plug-in modules 201 that extend Eclipse™ classes and utilize the Eclipse™ framework.

The UI layer 206 has access to an extensive widget set and graphics library known as the Standard Widget Toolkit (SWT) for Eclipse™. Further, the user modules 201 can utilize a higher-level toolkit called JFace that contains standard viewer classes such as lists, trees and tables and an action framework used to add commands to menus and toolbars. The designer tool 200 can also use a Graphical Editing Framework (GEF) to implement diagramming editors. The user modules 201 typically follow the Model-View-Controller design pattern where each user module 201 is both a view and a controller.

The data layer 212 includes a design-time model 208 and a runtime model 210 and represent the persistent state of the application. The separation of the layers UI layer 206 and the data layer 212 keeps presentation specific information in various views and allows multiple user modules 201 to respond to data model changes.

In the present embodiment, the data models 208, 210 are based on the Eclipse™ Modeling Framework (EMF). EMF is a framework and code generation facility. The framework provides model change notification, persistence support and an efficient API for manipulating EMF objects generically. A code generation facility is used to generate the model implementation and create adapters to connect the model layer 212 with the UI layer 206.

The service layer 214 provides services for the UI layer 206 such as a validation service, localization service, generator service, build service, and deployment service.

The localization service is responsible for supporting a build-time localization of user visible strings, supporting additional localization settings (such as default time and date display format, default number display format, display currency format, and the like), and creating resource bundle files (in a JAR file) that can be used during preparation of the deployable application. For example, the localization service can be implemented as a resource module for collecting resources that are resident in the design-time model 208 for inclusion in the deployable application. The JAR file can be a file that contains the class, image, and sound files for the application gathered into a single file and compressed for efficient downloading to the wireless device.

The generator service uses the localization service to produce customized resource bundles, such as language-specific bundles, for example. The build service implements preparation of the resource bundles and packaging of them with the deployable application. The localization service interacts with the tool editors and viewers for setting or otherwise manipulating language strings and local settings of the application.

The generator service generates application XML from the defined components, generates a mapping document, optimizes field ordering of the component descriptors, and generates dependencies and script transformation as required. In order to achieve this, the generator service collaborates with the design-time model 208 to obtain the content of the developed components that comprise the application. The generator service uses the validation service to check that both the application definitions and the mapping document are viable.

The generator service then produces the application XML, with inclusions and/or augmentations of the script of the workflow components and the mapping documents from relationships held in the design-time model 208. The generator service uses the localization service to produce the language resource bundles via a resource bundle interface.

The designer tool 200 uses Eclipse™ extension points to load additional plug-ins for two types of services: backend connectors 216 and device skins 218. The backend connectors 216 define extension points for facilitating communication with different backend servers 106. The device skin 218 defines an extension point for allowing the designer tool 200 to emulate different devices 102.

The backend connectors 216 are responsible for connecting to a selected one (or more) of the backend servers, providing an interface for accessing a description of the backend data source, and/or providing for the identification of Notification services, which push notifications to the wireless device 102. The backend connector 216 provides an interface to the backend server 106 for access of the data source description, and can provide a level of abstraction between implementation specific details of the backend messaging and generic messaging descriptions maintained by the design-time model 208. For example, the backend connector 216 is used to generate appropriate messaging and data component sets for the application, and is used by a model validator to verify the validity of existing message mapping relationships in the application under development. For example, the backend connector 216 can be implemented as an interface using an API call as the protocol to access the underlying backend data source 106, for example using a Web Service Definition Language (WSDL) Interface for WebServices.

The UI Layer 206 uses a Model-View-Controller (MVC) pattern where each user module 201 can be both a viewer and a controller. As controllers, user modules 201 interact with the model layer 212 models with some related control logic as defined by the MVC pattern. In the present embodiment, both editors and viewers are examples of user modules 201 that commit changes to the models immediately upon implementation. Wizards are user modules 201 that are step-driven by a series of one or more dialog interfaces, wherein each dialog interface gathers specific information from a user of the design tool 200. Wizards 204 apply no changes to the models until confirmation is received, such as selecting a finish button.

As viewers, the user modules 201 are observers of the models and are used to interact or otherwise test and modify the models of the application. When the model data changes, the models are notified and respond by updating the presentation of the application. The design-time model 208 is the current version of the application in development and is accessed by users employing the user modules 201 to interact with the associated data of the design-time model 208. Modules 201 can also trigger validation actions on the design-time model 208. User modules 201 can also cause some or all of the application to be generated from the design-time model 208. In general, the design-time model 208 accepts a set of commands that affects the state of the model 208, and in response may generate a set of events. Each user module 201 includes the set of commands and the events that affect the module 201 and data model 208 pairing.

The design-time model 208 represents the state of an application development project and interacts with the user modules 201 by notifying user modules 201 when the state of the design-time model 208 has changed. The design-time model's 208 primary responsibility is to define an application, and, accordingly, may include: data component definitions; global variable definitions; message component definitions; resource definitions; screen component definitions; scripts; style definitions. The design-time model 208 responds to commands of each editor and/or viewer. The design-time model 208 also sends events to user modules 201 in response to changes in the design-time model 208, as well as communicating with the other modules 201 when the design-time model 208 has changed.

The following describes the mechanism used by the user modules 201 to interact with the design-time model 208. The design tool 200 uses the EMF.Edit framework provided by Eclipse™ and generated code as a bridge 213 between the UI layer 206 and the model layer 212. Following the Model-View-Controller pattern, the user modules 201 do not know about the design-time model 208 directly but rely on interfaces to provide the information needed to display and edit the data in the design-time model 208.

For example, a tree viewer uses a TreeContentProvider and LabelProvider interface to query the structure of the tree and get text and icons for each node in the tree respectively. Table viewers and list viewers work in a similar way but use the structured ContentProvider and LabelProvider interfaces.

Each class in the design-time model 208 is a change notifier. That is, anytime an attribute or reference is changed an event is triggered. In EMF a notification observer is called an adapter because not only does it observe state changes, but it can also extend the behaviour of the class to which it is attached by supporting additional interfaces. An adapter is attached to a model object by an adapter factory. An adapter factory is asked to adapt an object with an extension of a particular type. The adapter factory is responsible for creating the adapter or returning an existing one, the model object does not know about adapting itself.

The design tool 200 uses EMF to generate a set of adapters for the data model 208 called item providers. Each item provider is an adapter that implements provider interfaces to extend the behaviour of the model object so it can be viewed and edited. At the same time, each item provider is a notification observer that can pass on state changes to listening views. The design tool 200 connects the user modules 201 to the design-time model 208 by configuring them with one or more EMF.Edit classes. Each EMF.Edit class supports an Eclipse™ UI provider interface. The EMF.Edit class implements an interface call by delegating the interface call to an adapter factory. The adapter factory then returns a generated adapter that knows how to access the design-time model 208. When the state of the design-time model 208 changes, the same adapters are used to update the user modules.

The following commands are example commands that can affect related modules 201 of the UI layer 206: ComponentAdded—a component has been added to the application; ComponentRemoved—a component has been removed from the application; ComponentRenamed—a component has been renamed; NavigationControlChanged—a button or menu item has been added, removed or had its properties changed on a screen of the application; DataBindingChanged—a data-bound control has been added, removed or had its properties changed on a screen; ScreenParameterListChanged—a parameter has been added or removed from one of the screen components; FieldMappingChanged—a message level, field level or prototype mapping has changed; MessageContainmentChanged—a containment relationship has changed; MessageFieldChanged—a message field has been added, removed or had its properties changed for a message and/or a screen component; DataFieldChanged—a data field has been added, been removed or had its properties changed from a message, data and/or screen component; NavigationChanged—a script that may contain navigation code has changed of a workflow component; LocalizedStringChanged—a literal string has been added, removed or changed; and ExitCodeChanged—Exit code has been added or removed from a script of the workflow component.

Figure 3:
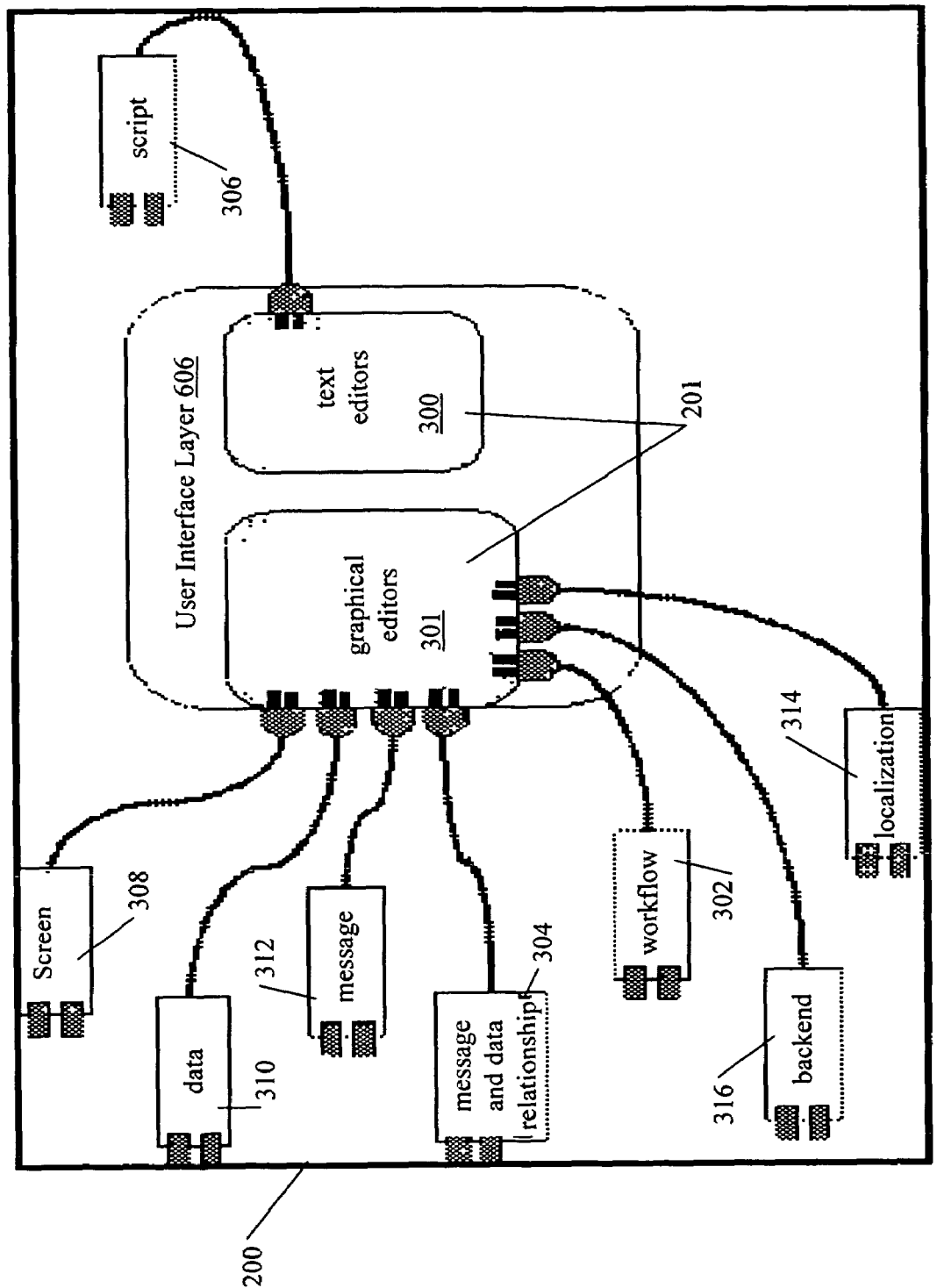
FIG. 3 is a block diagram illustrating design tool plug-ins.

Referring to FIG. 3, the distribution of user modules 201 as Eclipse™ plug-ins is shown. User modules 201 fall broadly into two categories: Text Editors 300, which implement standard line-based editing functionality; and Graphical Editing Framework (GEF) Editors 301, which provide an edit space in which to draw objects. A GEF Editor 301 in the context of the design tool 200 can contain a palette and a canvas, as is known in the art. The user can drop nodes (entities) from the palette onto the canvas and add connections to define relationships therebetween, so as to define the content and interrelationships of the components of the application. It will be recognized that the user modules 201 are used to create and modify definitions contained in the components as well as to create and modify the interdependencies therebetween. Further, it will be recognized that the user modules 201 can be a combination of text-based and/or graphical-based modules 201, as desired.

User Modules

As previously described, the user modules 201 are not directly aware of the design-time model 208. Generally, the user module 201 creates a command to change the design-time model 208 so that the change can be undone through an undo API (not shown). The user module 201 can be configured with an EMF core object called an editing domain that maintains a command stack. The editing domain uses the adapter factory to find an adapter that can create the command. The generated adapter class (ItemProvider) creates the command. The user module 201 executes the command by using the command stack. Further, because the ItemProvider is a notification observer, it is notified when the design-time model 208 changes. The ItemProvider in turn notifies a corresponding provider. The provider instructs the user module 201 to refresh after a change notification.

Script Editor

The script editor is a constrained text editor for providing relationships between application components. Typically, this information is provided as part of the workflow component. Some commands, such as creating functions, can be restricted such that they are not user-definable in the component application. Accordingly, when a function is created, the events generated by the script editor 306 are fixed. Other commands, such as SavesSript for example, may be edited by the script editor 306. SaveScript is used when the user saves a script of the application. In the present embodiment, Save- Script triggers the design-time model 208 events Navigation-Changed, LocalizedStringChanged and ExitCodeChanged, if successful.

Further, the script editor can react to events. For example, ComponentRemoved indicates whether a removed component affects input parameters to the script or globals used by the script. If the removed component affects the script, the script editor prompts the user of the design tool 200 that the script is invalid.

A sample interface of the script editor extends the org.Eclipse.ui.editors extension point of the Eclipse™ framework by implementing a subclass of the org.Eclipse.ui.editors.texteditors hierarchy. The design tool 200 coordinated the creation and/or modification of scripts in the components as well as the inter-relation of the script affecting other associated components of the application.

Screen Editor

The screen editor 308 facilitates creation and modification of the structured definition language code in the screen components associated with display of data on the device 102. UI controls for inclusion in the screen components can be dropped onto a form canvas in the editor. Control properties, including event handlers, can be edited by the screen editor 308.

Sample commands that can be edited by the screen editor 308 include the following commands. ButtonChange is sent to the design-time model 208 when the developer changes a button control. This command triggers NavigationControlChanged of the design-time model 208 if successful. MenultemChange is sent when the developer changes a menu item. This command triggers NavigationControlChanged of the design-time model 208 if successful. ChangeScript is sent when the developer changes a script. This command triggers NavigationControlChanged of the design-time model 208 if successful. QueryMessages is sent when the developer needs a list of available messages that the screen of the application may send or refresh, and returns a list of available messages. QueryData is sent when the developer needs a list of available data objects to bind controls to and returns a list of available data. NonNavigationControlChange is sent when a control that does not affect navigation has been modified. DataBindingChange is sent when a data binding has changed. This command triggers DataBindingChanged and ScreenParameterListChanged of the data model 208 if successful.

Sample input events to the screen editor 308 include the following. An event ComponentRemoved informs the screen editor that a component to which a screen component refers has been removed. An event ComponentRenamed is similar to ComponentRemoved. An event ScreenParameterListChanged modifies the screen component if a parameter used has been modified. The screen component either adjusts that parameter or warns the developer that those dependencies are no longer valid and must be changed. An event MessageFieldChanged checks to see if a field in question is used by the screen component. An event DataFieldChanged checks to see if any controls bound to the field(s) have changed and warns the developer accordingly.

A sample interface of the screen editor 308 extends org.Eclipse.ui.editors of the Eclipse framework using the GEF GraphicalEditor and/or a VE editor. The design tool 200 coordinates the creation and/or modification of screen definitions in the screen components as well as the inter-relation of the screen definitions affecting other associated components of the application.

Data Editor

The data editor 310 facilitates creation and modification of the structured definition language code in the data components of the application by providing the developer the ability to edit data component fields and properties. New data objects can be created from scratch, by prototyping existing data objects or based on data definition mappings to message objects in message components.

Sample commands editable by the data editor 310 include the following. AddRemoveFields is sent when the developer adds or removes a field from a data object definition. This command triggers DataFieldChanged of the data model 208 if successful. LinkToExternalData is sent when the developer links a data object definition to an external data object, such as a Calendar or Contacts data object for example. This command triggers DataFieldChanged of the data model 208 if successful.

A sample input events to the data editor 310 includes an event ComponentRemoved, which checks to see if a removed object was related to a message through prototyping or containment. The developer can then adjust the fields contained in the data object affected. An event ComponentRenamed is similar to ComponentRemoved.

A sample interface of the screen editor 308 extends org.Eclipse.ui.editors using the GEF GraphicalEditor. The design tool 200 coordinates the creation and/or modification of data definitions in the data components as well as the inter-relation of the data definitions and associated screen/message definitions affecting other associated components of the application.

Message Editor

The message editor 312 facilitates creation and modification of the structured definition language code in the message components of the application. The message designer allows a developer to create and edit messages components for sending messages to and receiving messages from backend servers 108. These messages can include both request/response pairs as well as subscribe/notify/unsubscribe notification messages. Message definitions can be created by prototyping existing messages or by templates based on backend services of the backend servers 108. Further, the message editor provides the ability to select a reliability level for the message. As previously described, the reliability level defines how the message is to be handled at the device 102 and the application gateway 106, including delivery, acknowledgement and persistence. The message reliability can be set by an appropriate UI input mechanism such as a drop down menu or radio button selection. The message reliability can be set on a per message or per application level.

Sample commands that can be edited by the message editor 312 include AddRemoveFields, which is sent when a field is added to or remove from a message in a message component.

Sample input events to the message editor 312 include the following. An event ComponentRemoved checks to see if a component that referenced the message definition has been removed. An event ComponentRenamed is similar to ComponentRemoved. An event FieldMappingChanged checks to see if a field mapping effects the message definitions being edited.

A sample interface of the screen editor 308 extends org.Eclipse.ui.editors using the GEF GraphicalEditor. The tool design 200 coordinates the creation and/or modification of message definitions in the message components as well as the inter-relation of the created/modified message affecting other associated components of the application.

Workflow Editor

The workflow editor 302 facilitates creating and modifying the command code in the workflow components of the application. The workflow editor 302 defines the screen-to-screen transitions that form the core of the visual part of the component application. Screens and transitions between screens due to user/script events are rendered visually.

Sample commands that can be edited by the workflow editor 302 include the following. QueryScreens is sent when the developer wants a list of screens to select from, such as when adding a new screen to the workflow. QueryScripts is sent when the developer wants a list of scripts to call on a screen navigation event. QueryArrivingMessages is sent when the developer wants a list of response messages (including notifications) on which to key screen transitions. AddComponent is sent when the developer wants to add a new screen, message or script to the workflow that doesn't already exist in the workflow. This command triggers ComponentAdded of the data model 208 if successful. ChangeNavigation is sent when the developer adds a new navigation node to the workflow. This command triggers NavigationChanged of the design-time model 208 if successful.

Sample input events to the workflow editor 302 include the following. An event ComponentRemoved checks to see if a removed component is a workflow object. The Workflow updates itself by deleting all relationships with this object definition. An event ComponentRenamed checks to see if a renamed component is a workflow object. The workflow updates its visual with the new name of the component. An event NavigationControlChanged checks to see if the workflow needs to update its view of the navigation based on a control change. If, for example, a button has been added to a screen in the workflow, then the view is updated to show the availability of a new navigation node on that screen. An event ScreenParameterListChanged checks to see if a screen's parameter list has changed and if the screen is in the workflow. The view of any navigation involving that screen is updated. An event NavigationChanged checks to see if a possible navigation change has occurred. The change is parsed and any necessary updates are made to the view. An event ExitCodeChanged checks to see if an exit point has been added/removed. The editor view is updated to reflect this visually.

A sample interface of the screen editor 308 extends org.Eclipse.ui.editors using the GEF GraphicalEditor.

Message-Data Relationship Editor

The message editor 304 facilitates creating and modifying the structured definition language code in the inter-related message and data components of the application. The message/data relationship editor creates and edits relationships between message components and data components. These mappings effect how a data component is populated on message arrival at the device 102 when running the application. For example, data object definitions common between data and message components can exist such that the data object definitions are resident in the data component, while a data mapping definition links the message component to the data object definition in the data component is resident in the message component, or vice versa. A similar configuration can be employed for data object definitions common between screen and data components, whereby the data object definition is resident in one of the components and the data mapping definition is resident in the other associated component.

Sample commands that can be edited by the editor 304 include the following. AddComponent is sent when a new data or message is added to the relationship diagram with the effect of also adding that component to the application being developed. This command triggers ComponentAdded of the design-time model 208 if successful. QueryMessages is sent when the developer needs a list of Messages to map. QueryData is sent when the developer needs a list of Data to map. ChangeMessageLevelMapping is sent when the developer changes a message-level mapping. This command triggers FieldMappingChanged of the data model 208 if successful. ChangeFieldLevelMapping is sent when the developer changes a field-level mapping. This command triggers FieldMappingChanged of the data model 208 if successful. ChangePrototype is sent when the developer changes a prototype relationship between data objects. This command triggers FieldMappingChanged of the data model 208 if successful. ChangeContainment is sent when the developer changes a containment relationship between data objects. This command triggers MessageContainmentChanged of the data model 208 if successful.

Sample input events to the editor 304 include the following. An event ComponentRemoved checks to see if the object removed was a message or data. The relationship mapper deletes any relationships involving the removed object. An event ComponentRenamed checks to see if the renamed object is involved in any mapping relationships. The visual representation of the mapped object is updated with the new name. An event MessageFieldChanged checks to see if the message involved is present in the relationship editor. The field change is then reflected in the visual representation of the message. If the field in question is involved in a mapping, then changes are reflected and the developer may need to be warned of broken mappings if applicable. An event DataFieldChanged is similar to MessageFieldChanged except using data instead of messages.

A sample interface of the editor 304 extends org.Eclipse.ui.editors using the GEF GraphicalEditor. The design tool 200 coordinates the creation and/or modification of message/data definitions in the message/data components as well as the inter-relation of the created/modified message/data definitions affecting other associated components of the application.

Localization Editor

The localization editor 314 allows the developer to collect all strings that will be visible to the application end-user (of the device 100) and edit them in one place. The editor 314 also allows the developer to create multiple resource mappings for each string into different languages. A sample command that can be edited by the editor 314 includes ChangeLocalizeString, which is sent when the developer adds, deletes or modifies a localized string. A sample input event to the editor 314 includes an event LocalizedStringChanged, which is used to determine when a string literal has been changed in the script editor or a label has changed in the screen editor 308. The localization editor 314 can extend the org.Eclipse.ui.editors interface by extending an EditorPart.

Backend Visualizer Editor

The backend visualizer editor 316 shows the developer the relationships between message components and the backend servers that drive the components. The editor 316 also allows the developer to add new backend servers to the list of those supported by the application in development. In addition to interaction with the design-time data model 208, as is described for other modules 201 using commands and events received, the Backend Visualizer editor 316 collaborates with the backend connector. The backend connector 216 allows the visualizer to request a ServicesInterface from a registry of known service types. A list of services of this type is returned that can queried by name or by iteration.

Sample commands that can be edited by the editor 316 include the following. AddComponent is sent when the developer adds a new message. This command triggers ComponentAdded of the data model 208 if successful. SpecifyMapping is sent when the developer connects a message to a selected backend server 108.

Sample input events to the editor 316 include the following. An event ComponentRemoved checks to see if the component is a message. The backend visualizer adjusts its mappings for that message. An event ComponentRenamed is similar to ComponentRemoved. An event MessageFieldChanged validates the message field against what exists on the backend server 108 and notifies the developer visually of any broken mappings. Backend servers 108 are accessed through direct calls to the service layers. Optionally, background processing may be used to keep network processing from blocking UI threads. The Editor 316 can extend the org.Eclipse.ui.editors using the GEF GraphicalEditor.

Build Service

The design tool 200 further comprises a build service for building a deployable form of the application and generates the deployable application bundle file in a JAR format, for example. The build service receives/retrieves application elements such as available application XML, mapping documents, resource bundles and resources as described above. These application elements are provided via the design tool 200 by the generator service. The build service comprises a build engine for generating the deployable application bundle. The application bundle is made available to a deployment service.

It is recognized that build service can be packaged either as part of the application development environment 107 or separately therefrom. The latter case would enable a developer to bypass using the design tool 200 to develop the component application. The developer could, therefore, still have access to the build service via an external interface for building the application bundle.

Deployment Service

The deployment service connects to the repository 124 to deposit and/or publish a generated deployment descriptor for a given application. The deployment service also provides the available application JAR file at deployment time. Although the deployment service does not install the application JAR file, the deployment service inspects the JAR file to determine what localized components, such as which languages are supported, for example. This information can be added to the descriptor file. Similar to the build service, the deployment service can be packaged either as part of the application development environment 107 or separately therefrom.

Notification Generation

An application generator service process is initiated by the developer via a Graphical User Interface (GUI). It is recognized that the generator service can be configured as a collection of modules, such as a code module for generating the XML and a mapping module for generating the mapping descriptors. The following will describe the generation of an application using a "bottom-up" approach, with emphasis on generating notification-based applications.

A bottom-up approach refers to the generation of an application based on a pre-existing backend connector messaging description. In the present embodiment, the message description is defined in WSDL although another structured language may be used. This approach is particularly useful when a backend server 108 has published its message description. That is, backend servers 108 may make their services known to potential application developers by publishing its message description. The message description may be made available to the general public or to specific users on a subscription basis, for example. Accordingly, if an application developer wishes to include in an application access to a backend server 108 having a published message description, or to build an application based on access to such a backend server 108, the application development is facilitated by the design tool 200 using the bottom-up approach. The design tool 200 accesses and processes the message description for creating application elements having access to the corresponding backend server 108. The following process describes the development of notification-based applications.

Figure 4:
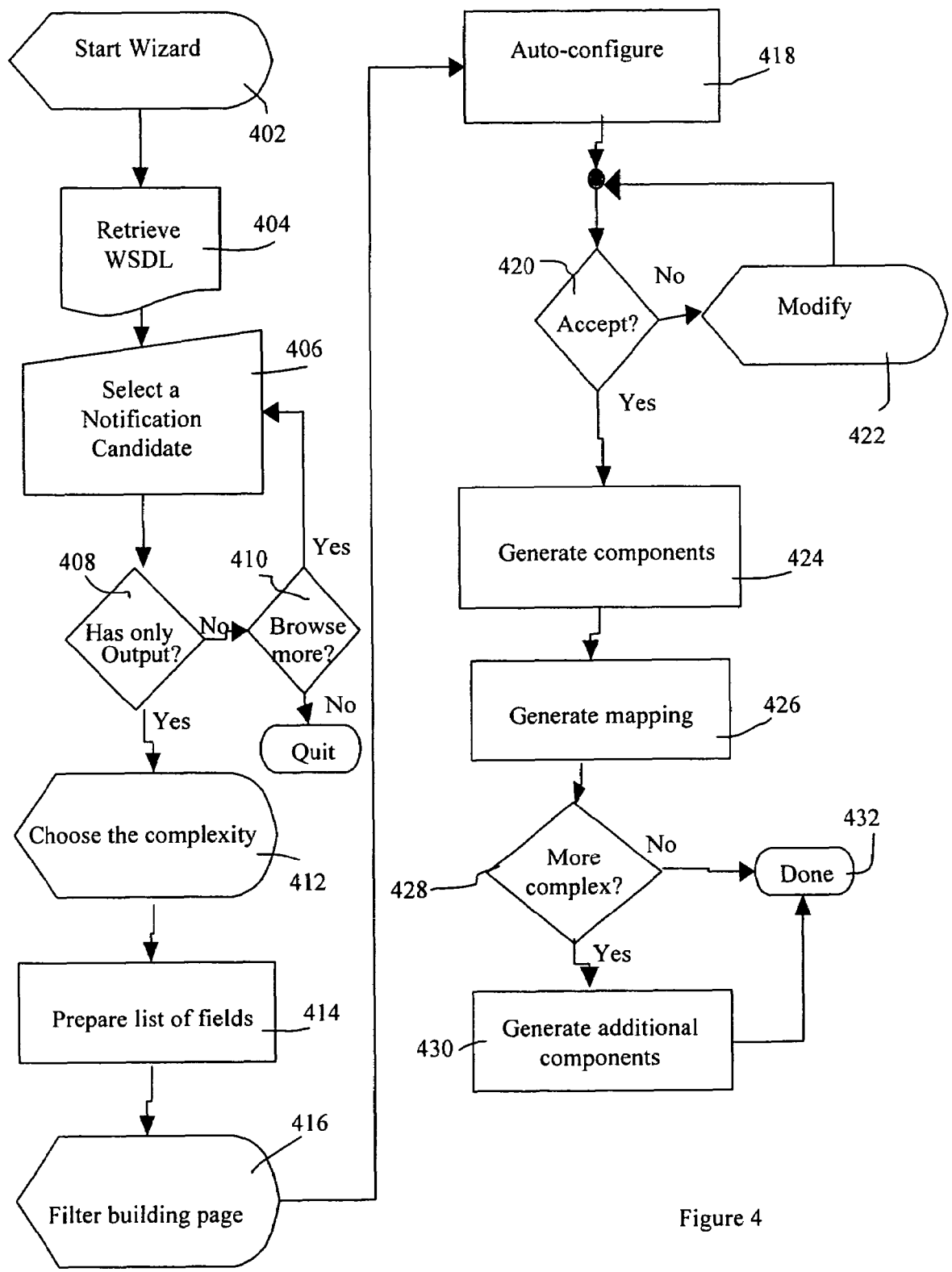
FIG. 4 is a flowchart illustrating a "bottom-up" approach for developing an notification-bases application.

Referring to FIG. 4, a flowchart illustrating the process of the "bottom-up" approach is illustrated generally by numeral 400. In step 402, the developer initiates a program wizard interface. A program wizard is a program automation module that facilitates implementation of a series of steps while limiting expertise required by a developer, as is known in the art.

In step 404, the program wizard prompts the developer to enter a location of the target WSDL document. Often, this location is a uniform resource location (URL) of the backend server 108. In step 406, the wizard retrieves the WSDL document and parses it for available operations provided by the backend server 108.

In step 408, the wizard determines if an operation has only an output or whether it also has inputs. Since notifications provide data from the backend server 108 to the wireless device 102 without requiring an explicit request for the data, they will likely not have a defined input as part of their WSDL specification. Accordingly, if an operation only has an output, it is considered as a potential notification and is presented to the developer as such. Alternatively, if an operation has an input associated with it, it is likely not a notification and, in step 410 the wizard determines if there are other operations to analyze. If so, the wizard returns to step 406 and selects another operation defined by the WSDL document. This process occurs for all operations in the WSDL document and the developer is provided with a list of notifications provided by the backend server 108.

In step 412 the developer is given the opportunity to select the complexity of the notification application to generate. For example, at a basic level the wizard generates message components and data components. In a more complex application level, screen components and scripts providing logical navigation between screens in accordance with the notification are also generated.

At a higher level of complexity, the wizard builds components required for handling subscription types and subscription instances as well as components required for managing the subscriptions on the wireless device 102. The functionality of such components include browse, see-details, unsubscribe and the like.

At yet a higher level of complexity, the wizard can build components for managing the notifications on the wireless device 102. For example, components can be built for managing whether or not the notifications are persisted, or whether or not to display a dialog advertising the notification on the wireless device 102.

In step 414, the wizard prepares a list of fields available for the selected notification and in step 416 presents them to the developer as part of a filter-building page. The filter-building page provides the developer with a tool to create a notification filter in order to receive the notification as desired. For example, the notification filter can be an expression based on fields defined in the notification or an expression based on custom fields. The filter will be used by the backend server 108 to determine the triggering condition for generating the notification. Once the user has selected the desired fields from the list, the wizard builds the filter. In the present embodiment, the filter is represented as an Xpath-based expression, which will be attached to the subscribe operation.

In step 418, the wizard automatically configures the subscribe, unsubscribe and subscription-end operations of the notification. That is, the wizard automatically determines the operations exposed in the message descriptor suitable for each action. Further, in the more complex application mode, determined at step 412, the wizard generates the screens providing the visual representation of these operations to the user of the wireless device 102. Examples of such screens include subscribe, unsubscribe and subscription-end screens.

In step 420, the automatically configured subscription is presented to the developer for approval. If the developer does not approve of the automatic configuration of the subscribe, unsubscribe and subscription-end operations, the wizard proceeds to step 422. In step 422, the developer has the opportunity to modify the configuration as desired. When the developer is satisfied with the subscribe, unsubscribe and subscription-end operations, the wizard proceeds to step 424.

In step 424, the wizard generates message components, data components, screen components and scripts for the subscribe, unsubscribe, subscription-end and notification operations in accordance with the approved subscription. Further, in step 426, the wizard generates a mapping document that correlates the generated message components with the corresponding WSDL messages. The mapping document will be deployed at the application gateway 106 for facilitating communication between a wireless device 102, executing the notification-based application, and the corresponding backend server 108.

In step 428 it is determined whether or not the generated notification-based component application is a more complex component application, as determined in step 412. If not, the wizard's task is complete and, at step 432, the wizards ends. If the generated notification-based component application is a more complex component application, in step 430, the wizard generates screen components and scripts for managing subscriptions. Once this is complete, the wizards ends at step 432.

Once the notification-based components have been created by the wizard, the components can be enhanced as desired by the developer. In one embodiment, the notification-based components are integrated into an existing application for providing notification service to the application. In another embodiment, the developer can further develop an application around the notification-based components.

Figure 5:
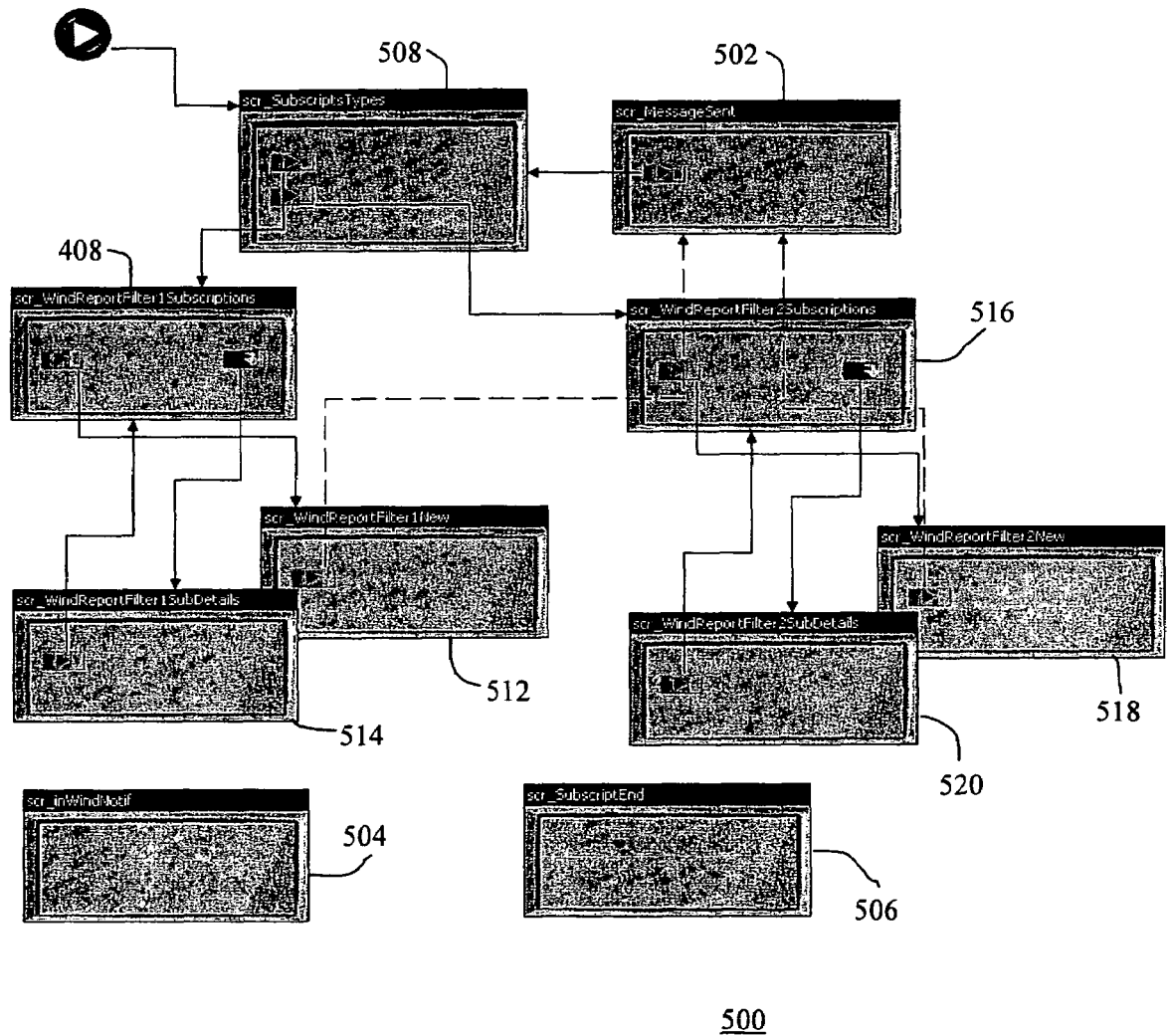
FIG. 5 is a schematic diagram illustrating sample generated screen components or a notification-based application.

The operation described above will now be exemplified with reference to Appendices A, B and C. Appendix A is a sample WSDL document that may be provided by a backend server implementing a Web Service. In general terms, the Web Service provides specific information regarding wind speeds. Appendix B is a sample of the application components that are generated by the design tool 200 based on the WSDL document of Appendix A. Appendix C is a mapping document generated by the design tool 200 based on the WSDL document of Appendix A and in accordance with the generated XML of Appendix B. The mapping document is packaged with the application bundle and used at the gateway server routing message between applications executing on the wireless device and a corresponding backend server. Further, FIG. 5 provides a visual illustration of the screen components and scripts generated by the following example, shown generally by numeral 500.

Referring once again to FIG. 4, in step 406, only one operation "WindWarns" is made available by the WSDL document. Accordingly, it is analyzed to determine if it is a notification. Since "WindWarns" only has an output message "WindNotifMsg", at step 408 the wizard determines that it is a notification-type operation and proceeds to step 412. At step 412 the developer selects the level of complexity for which the wizard is to use to generate the component application. In the present example, a level of complexity is selected that provides several device-based management screen components, as will be described with reference to the generation of such screens.

In step 414, the wizard prepares a list of the available fields, which in the present example includes date, time, speed, location, county, state, lat, long and comments. In step 416, the developer uses the filter-building page to create the required filters. In the present example, the developer creates two filters. The first filter WindReportFilter1 is used to request notifications by the date field. The second filter WindReportFilter2 is used to request notifications by the speed field. For each filter, the wizard prepares a corresponding subscription.

In step 418, the wizard automatically configures the subscribe, unsubscribe and subscription-end operations of the subscription. The proper messages have been mapped by default. In step 420, the developer chooses to accept the automatic configuration and the wizard continues to step 424.

In step 424, the wizard generates XML for the required components of the component-based application. In the present example, these components include data components, message components, screen components, and scripts.

Data components include WindReport, WindReportFilter1 and WindReportFilter2. WindReport defines the notification data-fields. WindReportFilter1 and WindReportFilter2 define the notification filter-fields defined by the developer for each filter.

Message components include inWindNotifMsg, outSubscribeMsg1, outUnsubscribeMsg, inSubscriptEndMsg and outSubscribeMsg2. inWindNotifMsg defines the incoming notification message. outSubscribeMsg1 defines a subscription message for the data defined by WindReportFilter1. Similarly, outSubscribeMsg2 defines a subscription message for the data defined by WindReportFilter2. outUnsubscribeMsg defines a message for unsubscribing from a predefined subscription. inSubscriptEndMsg defines a message for receiving an indication from a backend server 108 (event-source) that the subscription has ended.

Screen components include scr_MessageSent 502, scr_inWindNotif 504, and scr_SubscriptEnd 506. scr_MessageSent 502 indicates to the user of the wireless device 102 that a subscription message has been sent. scr_inWindNotif 504 displays the notification to the user of the wireless device 102. scr_SubscriptEnd 506 provides the user of the wireless device 102 with a special notification for terminating the subscription. The remaining screens relate to more complex function, i.e. managing subscriptions, and in step [00105] is determined whether they are generated or not.

Scripts include script_Close, script_outSubscribe1, script_outSubscribe2, script_SetExpiresDate, script_inWindNotif, script_SubscriptEnd, onError, onExit, script_WindReportFilter1 Unsub, script_WindReportFilter1Unsub. The function of these scripts can be readily determined by their names.

In step 426, the mapping document illustrated in Appendix C is generated to map the message components with the corresponding message elements of the WSDL document illustrated in Appendix A. As previously described, the WSDL documents defines data available from the backend server 106. Accordingly, the mapping document is used by the gateway to correlate messages communicated with the wireless device 106 and messages communicated with the backend server 106, thereby facilitating communication.

In step 428, it is recalled that the application requires some additional complexity. In the present example, the developer has decided to provide the user of the wireless device 102 with an opportunity to create a subscription based on the corresponding designed filter. Accordingly, in step 430, the wizard generates the additional screen and script components to manage that type of subscription. The screens include menu-choices for navigation and triggering actions like unsubscribe. This process is repeated twice in the example, once for each different subscription and filter.

Specifically, the additional screen components include scr_WindReportFilter1New 512, scr_WindReportFilter1Subscriptions 510, scr_WindReportFilter1SubDetails 514, scr_SubscriptsTypes 508, scr_WindReportFilter2New 518, scr_WindReportFilter2Subscriptions 516 and scr_WindReportFilter2SubDetails 520.

scr_SubscriptsTypes 508 provides the user of the wireless device with an interface to select one of the two predefined filters. scr_WindReportFilter1Subscriptions 510 and scr_WindReportFilter2Subscriptions 516 provide similar interfaces for their respective filter-instantiated subscriptions. As previously described, the developer designed a first filter, filter 1, using the notification field date and a second filter, filter 2, using the notification field speed. Each interface provides the user with an option to view the subscription details, modify the subscription or unsubscribe from the notification. scr_WindReportFilter1SubDetails 514 and scr_WindReportFilter2SubDetails 520 provide similar interfaces for their respective filters. That is, each interface provides the user of the wireless device 102 with the subscription details and the option to unsubscribe from the notification. scr_WindReportFilter1New 512 and scr_WindReportFilter2New 518 provide the respective filter interfaces for instantiating new subscriptions. That is, each time a new subscription is created, it is assigned an identifier and values for the filter fields. The backend server 108 will then use that information to evaluate the notification criteria.

Once the components have been generated, the wizard is complete and the developer has a developed notification-based component application with which to work.

It will be appreciated by a person of ordinary skill in the art that the above example is not meant to be restrictive and is provided for illustrative purposes only.

Although the present invention is described above with reference to a bottom-up approach, it will be appreciated that the concept can be applied to other design patterns. For example, "top down" application development refers to a method of developing an application using the tools provided by the design tool 200. Accordingly, as components are developed, the design tool 200 creates the corresponding WSDL elements and a corresponding mapping document as each component is developed and similarly, tracks any relevant changes made.

Further, although preferred embodiments of the invention have been described herein, it will be understood by those skilled in the art that variations may be made thereto without departing from the spirit of the invention or the scope of the appended claims.

APPENDIX A

```
<?xml version="1.0" encoding="UTF-8"?>
<wsdl:definitions xmlns:soap="http://schemas.xmlsoap.org/wsdl/soap/"
xmlns:wse="http://schemas.xmlsoap.org/ws/2004/08/eventing"
xmlns:apachesoap="http://xml.apache.org/xml-soap"
xmlns:impl="http://windwarn.wse.samples.wica.rim.net"
xmlns:intf="http://windwarn.wse.samples.wica.rim.net" xmlns:wsdl="http://schemas.xmlsoap.org/wsdl/"
xmlns:wsdlsoap="http://schemas.xmlsoap.org/wsdl/soap/"
xmlns:xsd="http://www.w3.org/2001/XMLSchema"
xmlns:ns="http://schemas.xmlsoap.org/ws/2004/08/addressing"
targetNamespace="http://windwarn.wse.samples.wica.rim.net">
        <wsdl:import namespace="http://schemas.xmlsoap.org/ws/2004/08/eventing"
location="http://schemas.xmlsoap.org/ws/2004/08/eventing/eventing.wsdl"/>
        <wsdl:types>
            <schema targetNamespace="http://windwarn.wse.samples.wica.rim.net"
elementFormDefault="qualified" blockDefault="#all" xmlns="http://www.w3.org/2001/XMLSchema">
                <element name="WindReportA" type="impl:ArrayOfWindReport"/>
                <complexType name="WindReport">
                    <sequence>
                        <element name="Date" type="xsd:string"/>
                        <element name="Time" type="xsd:string"/>
                        <element name="Speed" type="xsd:string"/>
                        <element name="Location" type="xsd:string"/>
                        <element name="County" type="xsd:string"/>
                        <element name="State" type="xsd:string"/>
                        <element name="Lat" type="xsd:string"/>
                        <element name="Long" type="xsd:string"/>
                        <element name="Comments" type="xsd:string"/>
                    </sequence>
                </complexType>
                <complexType name="ArrayOfWindReport">
                    <sequence>
                        <element maxOccurs="unbounded" minOccurs="0"
name="windrep" nillable="true" type="impl:WindReport"/>
                    </sequence>
                </complexType>
```

APPENDIX A-continued

```
            </schema>
        </wsdl:types>
        <wsdl:message name="WindNotifMsg">
            <wsdl:part name="body" element="impl:WindReportA"/>
        </wsdl:message>
        <wsdl:portType name="WindWarns" wse:EventSource="true">
            <wsdl:operation name="WindOp">
                <wsdl:output name="WindNotifMsg" message="impl:WindNotifMsg"/>
            </wsdl:operation>
        </wsdl:portType>
        <wsdl:binding name="WindWarnSoapBinding" type="impl:WindWarns">
            <soap:binding style="rpc" transport="http://schemas.xmlsoap.org/soap/http"/>
            <wsdl:operation name="WindOp">
                <wsdl:output>
                    <soap:body use="literal"/>
                </wsdl:output>
            </wsdl:operation>
</wsdl:binding>
<wsdl:binding name="EvSrcSoapBinding" type="wse:EventSource">
    <soap:binding style="rpc" transport="http://schemas.xmlsoap.org/soap/http"/>
    <wsdl:operation name="SubscribeOp">
        <wsdl:input>
            <soap:body use="literal"/>
        </wsdl:input>
        <wsdl:output>
            <soap:body use="literal"/>
        </wsdl:output>
    </wsdl:operation>
    <wsdl:operation name="SubscriptionEnd">
        <wsdl:output>
            <soap:body use="literal"/>
        </wsdl:output>
    </wsdl:operation>
</wsdl:binding>
<wsdl:binding name="SubsMgrSoapBinding" type="wse:SubscriptionManager">
    <soap:binding style="rpc" transport="http://schemas.xmlsoap.org/soap/http"/>
    <wsdl:operation name="RenewOp">
        <wsdl:input>
            <soap:body use="literal"/>
        </wsdl:input>
        <wsdl:output>
            <soap:body use="literal"/>
        </wsdl:output>
    </wsdl:operation>
    <wsdl:operation name="GetStatusOp">
        <wsdl:input>
            <soap:body use="literal"/>
        </wsdl:input>
        <wsdl:output>
            <soap:body use="literal"/>
        </wsdl:output>
    </wsdl:operation>
    <wsdl:operation name="UnsubscribeOp">
        <wsdl:input>
            <soap:body use="literal"/>
        </wsdl:input>
        <wsdl:output>
            <soap:body use="literal"/>
        </wsdl:output>
    </wsdl:operation>
</wsdl:binding>
<wsdl:service name="WindWarnServ">
    <wsdl:port name="WindWarnsPort" binding="impl:WindWarnSoapBinding">
        <soap:address location="http://mcacenco-w2k:8080/axis/services/WindWarn/WindWarnsPort"/>
    </wsdl:port>
        <wsdl:port name="EvSrcPort" binding="impl:EvSrcSoapBinding">
            <soap:address location="http://mcacenco-w2k:8080/axis/services/WindWarn/EvSrcPort"/>
        </wsdl:port>
        <wsdl:port name="SubsMgrPort" binding="impl:SubsMgrSoapBinding">
            <soap:address location="http://mcacenco-w2k:8080/axis/services/WindWarn/SubsMgrPort"/>
        </wsdl:port>
    </wsdl:service>
</wsdl:definitions>
```

APPENDIX B

```xml
<?xml version="1.0" encoding="iso-8859-1" ?>
<!DOCTYPE wiclet (View Source for full doctype...)>
<wiclet uri="Research_In_Motion.com/WindWarn_a2" name="WindWarn_a2"
    entry="scr_SubscriptsTypes" vendor="Research In Motion" version="1.1.0"
    size="3.5.10.2016" persistence="performant" messageDelivery="standard">
    <desc>Example for the "System and Method for Automating Detection and
        Construction of Notification Based Wireless Applications" patent
        application.</desc>
    <resource mimeType="image/png" url="envlp3.png" name="res_InputMessage" />
    <resource mimeType="image/png" url="envlp8.png" name="res_OutputMessage" />
    <resource mimeType="image/png" url="envlp4.png" name="res_MessageSent" />
    <resource mimeType="image/png" url="notification.png" name="res_Notification" />
    <resource mimeType="image/png" url="subscrTypes.png" name="res_SubscrTypes" />
    <resource mimeType="image/png" url="subscriptions.png" name="res_Subscriptions" />
    <resource mimeType="image/png" url="subscribe.png" name="res_Subscribe" />
    <resource mimeType="image/png" url="subscrEnd.png" name="res_SubscrEnd" />
    <resource mimeType="image/png" url="subscrDetails.png" name="res_SubsDetails" />
    <global name="gv_Filters" array="true" type="string" persist="true">
        <value>WindReportFilter1</value>
        <value>WindReportFilter2</value>
    </global>
    <global name="gv_ExpiresDate" type="date" array="false" persist="true" />
    <data name="WindReport" persist="true" key="Date">
        <field name="Date" type="string" array="false" />
        <field name="Time" type="string" array="false" />
        <field name="Speed" type="string" array="false" />
        <field name="Location" type="string" array="false" />
        <field name="County" type="string" array="false" />
        <field name="State" type="string" array="false" />
        <field name="Lat" type="string" array="false" />
        <field name="Long" type="string" array="false" />
        <field name="Comments" type="string" array="false" />
    </data>
    <data name="WindReportFilter1" persist="true" key="ID">
        <field name="ID" type="string" array="false" />
        <field name="Date" type="date" array="false" />
        <field name="SubscriptionDate" type="date" array="false" />
        <field name="Expires" type="string" array="false" />
    </data>
    <data name="WindReportFilter2" persist="true" key="ID">
        <field name="ID" type="string" array="false" />
        <field name="Speed" type="string" array="false" />
        <field name="SubscriptionDate" type="date" array="false" />
        <field name="Expires" type="string" array="false" />
    </data>
    <message name="inWindNotifMsg" script="script_inWindNotif">
        <field name="ID" type="string" array="false" />
        <field name="body" type="data" component="WindReport" array="true" />
        <alert beep="false" ribbon="false" />
    </message>
    <message name="outSubscribeMsg1" script="">
        <field name="body" type="data" component="WindReportFilter1" array="false" />
        <alert beep="false" ribbon="false" />
    </message>
    <message name="outUnsubscribeMsg" script="">
        <field name="ID" type="string" array="false" />
        <alert beep="false" ribbon="false" />
    </message>
    <message name="inSubscriptEndMsg" script="script_SubscriptEnd">
        <field name="ID" type="string" array="false" />
        <field name="reason" type="string" array="false" />
        <alert beep="false" ribbon="false" />
    </message>
    <message name="outSubscribeMsg2" script="">
        <field name="body" type="data" component="WindReportFilter2" array="false" />
        <alert beep="false" ribbon="false" />
    </message>
    <screen name="scr_MessageSent" dialog="true" layout="vertical" title="Message Sent">
        <region name="reg_0" layout="flow" visible="true">
            <image name="image0" resource="res_MessageSent" visible="true" />
            <label name="lbl0" inValue="The message has been sent..." visible="true" />
        </region>
        <region name="reg_OK" layout="flow" visible="true">
            <button name="btn_OK" inValue="OK" visible="true">
                <onClick transition="scr_SubscriptsTypes" transaction="none" />
            </button>
        </region>
        <menu />
    </screen>
```

APPENDIX B-continued

```xml
<screen name="scr_WindReportFilter1New" layout="vertical" title="New
      WindReportFilter1 Subscription" dialog="false">
   <var component="WindReportFilter1" name="newsub" />
   <region name="reg_0" layout="flow" visible="true">
      <image name="image0" resource="res_Subscribe" visible="true" />
      <label name="lbl0" inValue="Enter New Subscription:" visible="true" />
   </region>
   <region name="region1" layout="flow" visible="true">
      <label name="lbl1" inValue="SubscriptionName:" visible="true" />
      <edit mandatory="true" name="ID" mapping="newsub" visible="true"
            readOnly="false" type="text" />
   </region>
   <region name="region2" layout="flow" visible="true">
      <label name="lbl2" inValue="Date:" visible="true" />
      <edit mandatory="true" name="Date" mapping="newsub.Date" visible="true"
            readOnly="false" type="text" />
   </region>
   <region name="" layout="flow" visible="true">
      <button name="btn_Subscribe" inValue="Subscribe" visible="true">
         <onClick transition="script_outSubscribe1" params="newsub"
            transaction="none" />
      </button>
      <button name="btn_Back1" inValue="Back" visible="true">
         <onClick transition="script_Close" transaction="none" />
      </button>
   </region>
   <menu />
</screen>
<screen name="scr_WindReportFilter1Subscriptions" layout="vertical"
      title="WindReportFilter1 Subscriptions" dialog="false">
   <var component="WindReportFilter1" name="subs" />
   <region name="reg_0" layout="flow" visible="true">
      <image name="image0" resource="res_Subscriptions" visible="true"/>
      <label name="lbl0" inValue="Select Subscription:" visible="true" />
   </region>
   <singleChoice type="list" name="choice1" inValue="@WindReportFilter1[].ID"
         mapping="subs" visible="true" />
   <region name="reg_New" layout="flow" visible="true">
      <button name="btn_New" inValue="New" visible="true">
         <onClick transition="scr_WindReportFilter1New" transaction="none" />
      </button>
   </region>
   <region name="reg_Back" layout="flow" visible="true">
      <button name="btn_Back" inValue="Back" visible="true">
         <onClick transition="script_Close" transaction="none" />
      </button>
   </region>
   <menu>
      <menuItem name="mnu_Details" inValue="Details" visible="true">
         <onClick transition="scr_WindReportFilter1SubDetails" params="subs"
            transaction="none" />
      </menuItem>
      <menuItem name="mnu_Unsubscribe" inValue="Unsubscribe"
            visible="true">
         <onClick transition="script_WindReportFilter1Unsub" params="subs"
            transaction="none" />
      </menuItem>
   </menu>
</screen>
<screen name="scr_WindReportFilter1SubDetails" layout="vertical"
      title="WindReportFilter1Subscription Details" dialog="false">
   <param component="WindReportFilter1" name="par0" />
   <region name="reg_0" layout="flow" visible="true">
      <image name="image0" resource="res_SubsDetails" visible="true" />
      <label name="lbl0" inValue="Subscription details:" visible="true" />
   </region>
   <region name="" layour="flow" visible="true">
      <label name="lbl1" inValue="SubscriptionName:" visible="true" />
      <label name="lblID" inValue="@par0.ID" visible="true" />
   </region>
   <region name="" layout="flow" visible="true">
      <label name="lbl2" inValue="Date:" visible="true" />
      <label name="lblDate" inValue="@par0.Date" visible="true" />
   </region>
   <region name="" layout="flow" visible="true">
      <label name="lbl3" inValue="SubscriptionDate:" visible="true" />
      <label name="lblSubscriptionDate" inValue="@par0.SubscriptionDate"
            visible="true" />
   </region>
```

APPENDIX B-continued

```
<region name="" layout="flow" visible"true">
    <label name="lbl4" inValue="Expires:" visible="true" />
        <label name="lblExpires" inValue="@par0.Expires" visible="true" />
</region>
<region name="" layout="flow" visible="true">
    <button name="btn_OK" inValue="OK" visible="true">
        <onClick transition="scr_WindReportFilter1Subscriptions"
            transaction="none" />
    </button>
    <button name="btn_Unsubscribe1" inValue="Unsubscribe" visible="true">
        <onClick transition="script_WindReportFilter1Unsub" params="par0"
            transaction="none" />
    </button>
</region>
<menu />
</screen>
<screen name="scr_inWindNotif" layout="vertical" title="Notification inWindNotif"
    dialog="false">
    <param component="WindReport" name="par0" />
    <region name="reg_0" layout="flow" visible="true">
        <image name="image0" resource="res_Notification" visible="true" />
        <label name="lbl0" inValue="Notification received:" visible="true" />
    </region>
    <region name="region0" layout="flow" visible="true">
        <label name="lbl0" inValue="SubscriptionName:" visible="true" />
        <edit readOnly="true" name="ID" visible="true" mandatory="false"
            type="text" />
    </region>
    <region name="region1" layout="flow" visible="true">
        <label name="lbl1" inValue="Date:" visible="true" />
        <edit name="Date" inValue="@par0.Date" visible="true" readOnly="false"
            mandatory="false" type="text" />
    </region>
    <region name="region2" layout="flow" visible="true">
        <label name="lbl2" inValue="Time:" visible="true" />
        <edit name="Time" inValue="@par0.Time" visible="true" readOnly="false"
            mandatory="false" type="text" />
    </region>
    <region name="region3" layout="flow" visible="true">
        <label name="lbl3" inValue="Speed:" visible="true" />
        <edit name="Speed" inValue="@par0.Speed" visible="true" readOnly="false"
            mandatory="false" type="text" />
    </region>
    <region name="region4" layout="flow" visible="true">
        <label name="lbl4" inValue="Location:" visible="true" />
        <edit name="Location" inValue="@par0.Location" visible="true"
            readOnly="false" mandatory="false" type="text" />
    </region>
    <region name="region5" layout="flow" visible="true">
        <label name="lbl5" inValue="County:" visible="true" />
        <edit name="County" inValue="@par0.County" visible="true"
            readOnly="false" mandatory="false" type="text" />
    </region>
    <region name="region6" layout="flow" visible="true">
        <label name="lbl6" inValue="State:" visible="true" />
        <edit name="State" inValue="@par0.State" visible="true" readOnly="false"
            mandatory="false" type="text" />
    </region>
    <region name="region7" layout="flow" visible="true">
        <label name="lbl7" inValue="Lat:" visible="true" />
        <edit name="Lat" inValue="@par0.Lat" visible="true" readOnly="false"
            mandatory="false" type="text" />
    </region>
    <region name="region8" layout="flow" visible="true">
        <label name="lbl8" inValue="Long:" visible="true" />
        <edit name="Long" inValue="@par0.Long" visible="true" readOnly="false"
            mandatory="false" type="text" />
    </region>
    <region name="region9" layout="flow" visible="true">
        <label name="lbl9" inValue="Comments:" visible="true" />
        <edit name="Comments" inValue="@par0.Comments" visible="true"
            readOnly="false" mandatory="false" type="text" />
    </region>
    <region name="regionClose" layout="flow" visible="true">
        <button name=" btn_Close" inValue="Close" visible="true">
            <onClick transition="script_Close" params="par0" transaction="none" />
        </button>
    </region>
    <menu />
```

APPENDIX B-continued

```
    </screen>
-   <screen name="scr_SubscriptEnd" dialog="true" layout="vertical" title="Subscription
        End">
-       <region name="reg_0" layout="flow" visible="true">
            <image namne="image0" resource="res_SubscrEnd" visible="true" />
            <label name="lbl0" inValue="Subscription ended!" visible="true" />
        </region>
-       <region name="region1" layout="flow" visible="true">
            <label name="lbl2" inValue="The Subscription ended for:" visible="true" />
            <label name="lbl3" inValue="lbl3" visible="true" />
        </region>
-       <region name="region2" layout="flow" visible="true">
            <label name="lbl4" inValue="Reason:" visible="true" />
            <label name="lbl5" inValue="lbl5" visible="true" />
        </region>
+       <region name="reg_Close" layout="flow" visible="true">
        <menu />
    </screen>
-   <screen name="scr_WindReportFilter2New" layout="vertical" title="New
        WindReportFilter2 Subscription" dialog="false">
        <var component="WindReportFilter2" name="newsub" />
-       <region name="reg_0" layout="flow" visible="true">
            <image name="image0" resource="res_Subscribe" visible="true" />
            <label name="lbl0" inValue="Enter New Subscription:" visible="true" />
        </region>
-       <region name="region1" layout="flow" visible="true">
            <label name="lbl1" inValue="SubscriptionName:" visible="true" />
            <edit mandatory="true" name="ID" mapping="newsub" visible="true"
                readOnly="false" type="text" />
        </region>
-       <region name="region2" layout="flow" visible="true">
            <label name="lbl2" inValue="Speed:" visible="true" />
            <edit mandatory="true" name="Speed" mapping="newsub.Speed"
                visible="true" readOnly="false" type="text" />
        </region>
-       <region name="" layout="flow" visible="true">
-           <button name="btn_Subscribe" inValue="Subscribe" visible="true">
                <onClick transition="script_outSubscribe2" params="newsub"
                    transaction="none" />
            </button>
-           <button name="btn_Back1" inValue="Back" visible="true">
                <onClick transition="script_Close" transaction="none" />
            </button>
        </region>
        <menu />
    </screen>
-   <screen name="scr_WindReportFilter2Subscriptions" layout="vertical"
        title="WindReportFilter2 Subscriptions" dialog="false">
        <var component="WindReportFilter2" name="subs" />
-       <region name="reg_0" layout="flow" visible="true">
            <image name="image0" resource="res_Subscriptions" visible="true" />
            <label name="lbl0" inValue="Select Subscription:" visible="true" />
        </region>
        <SingleChoice type="list" name="choice1" inValue="@WindReportFilter2[].ID"
            mapping="subs" visible="true" />
-       <region name="reg_New" layout="flow" visible="true">
-           <button name="btn_New" inValue="New" visible="true">
                <onClick transition="scr_WindReportFilter2New" transaction="none" />
            </button>
        </region>
-       <region name="reg_Back" layout="flow" visible="true">
-           <button name="btn_Back" inValue="Back" visible="true">
                <onClick transition="script_Close" transaction="none" />
            </button>
        </region>
-       <menu>
-           <menuItem name="mnu_Details" inValue="Details" visible="true">
                <onClick transition="scr_WindReportFilter2SubDetails" params="subs"
                    transaction="none" />
            </menuItem>
-           <menuItem name="mnu_Unsubscribe" inValue="Unsubscribe"
                visible="true">
                <onClick transition="script_WindReportFilter2Unsub" params="subs"
                    transaction="none" />
            </menuItem>
        </menu>
    </screen>
-   <screen name="scr_WindReportFilter2SubDetails" layout="vertical"
        title="WindReportFilter2 Subscription Details" dialog="false">
```

APPENDIX B-continued

```
        <param component="WindReportFilter2" name="par0" />
    <region name="reg_0" layout="flow" visible="true">
        <image name="image0" resource="res_SubsDetails" visible="true" />
        <label name="lbl0" inValue="Subscription details:" visible="true" />
    </region>
    <region name="" layout="flow" visible="true">
        <label name="lbl1" inValue="SubscriptionName:" visible="true" />
        <label name="lblID" inValue="@par0.ID" visible="true" />
    </region>
    <region name="" layout="flow" visible="true">
        <label name="lbl2" inValue="Speed:" visible="true" />
        <label name="lblSpeed" inValue="@par0.Speed" visible="true" />
    </region>
    <region name="" layout="flow" visible="true">
        <label name="lbl3" inValue="SubscriptionDate:" visible="true" />
        <label name="lblSubscriptionDate" inValue="@par0.SubscriptionDate"
            visible="true" />
    </region>
    <region name="" layout="flow" visible="true">
        <label name="lbl4" inValue="Expires:" visible="true" />
        <label name="lblExpires" inValue="@par0.Expires" visible="true" />
    </region>
    <region name="" layout="flow" visible="true">
        <button name="btn_OK" inValue="OK" visible="true">
            <onClick transition="scr_WindReportFilter2Subscriptions"
                transaction="none" />
        </button>
        <button name="btn_Unsubscribe1" inValue="Unsubscribe" visible="true">
            <onClick transition="script_WindReportFilter2Unsub" params="par0"
                transaction="none" />
        </button>
    </region>
    <menu />
</screen>
<screen name="scr_SubscriptsTypes" layout="vertical" title="Subscription Filter
    Types" dialog="false">
    <region name="reg_0" layout="flow" visible="true">
        <image name="image0" resource="res_SubscrTypes" visible="true" />
        <label name="lbl0" inValue="Select Subscription Type:" visible="true" />
    </region>
    <button name="btn_WindReportFilter11" inValue="WindReportFilter1"
            visible="true">
        <onClick transition="scr_WindReportFilter1Subscriptions"
            transaction="none" />
    </button>
    <button name="btn_WindReportFilter22" inValue="WindReportFilter2"
            visible="true">
        <onClick transition="scr_WindReportFilter2Subscriptions"
            transaction="none" />
    </button>
    <menu />
</screen>
<script name="onError" />
<script name="onExit" />
<script name="script_Close" />
<script name="script_outSubscribe1">
    <param component="WindReportFilter1" name="par0" />
</script>
<script name="script_SetExpiresDate" />
<script name="script_WindReportFilter1Unsub">
    <param component="WindReportFilter1" name="par0" />
</script>
<script name="script_inWindNotif" />
<script name="script_SubscriptEnd" />
<script name="script_outSubscribe2">
    <param component="WindReportFilter2" name="par0" />
</script>
<script name="script_WindReportFilter2Unsub">
    <param component="WindReportFilter2" name="par0" />
</script>
</wiclet>
```

APPENDIX C

```xml
<?xml version="1.0" encoding="ASCII"?>
<map:wiclet xmlns:impl="http://windwarn.wse.samples.wica.rim.net"
xmlns:map="http://com.rim.wica/mapping.xsd"
xmlns:ns="http://schemas.xmlsoap.org/ws/2004/08/addressing"
xmlns:wsdl="http://schemas.xmlsoap.org/wsdl/"
xmlns:wse="http://schemas.xmlsoap.org/ws/2004/08/eventing"
xmlns:xsd="http://www.w3.org/2001/XMLSchema">
  <map:component map:mapName="impl:WindNotifMsg" map:mapType="message" map:name="inWindNotifMsg" map:secure="false">
    <map:field map:mapName="body/impl:windrep" map:mapType="element" map:name="body"/>
  </map:component>
  <map:component map:mapName="impl:WindReport" map:mapType="complexType" map:name="WindReport">
    <map:field map:mapName="impl:Date" map:mapType="element" map:name="Date"/>
    <map:field map:mapName="impl:Time" map:mapType="element" map:name="Time"/>
    <map:field map:mapName="impl:Speed" map:mapType="element" map:name="Speed"/>
    <map:field map:mapName="impl:Location" map:mapType="element" map:name="Location"/>
    <map:field map:mapName="impl:County" map:mapType="element" map:name="County"/>
    <map:field map:mapName="impl:State" map:mapType="element" map:name="State"/>
    <map:field map:mapName="impl:Lat" map:mapType="element" map:name="Lat"/>
    <map:field map:mapName="impl:Long" map:mapType="element" map:name="Long"/>
    <map:field map:mapName="impl:Comments" map:mapType="element" map:name="Comments"/>
  </map:component>
  <map:portType map:name="impl:WindWarns">
    <map:operation map:name="WindOp">
      <map:output map:component="inWindNotifMsg"/>
    </map:operation>
  </map:portType>
  <map:subscription map:expiryDelta="10">
    <map:filter map:component="WindReportFilter1" map:expression="Date=%Date%"/>
    <map:notification map:component="inWindNotifMsg"/>
    <map:subscribe map:component="outSubscribeMsg1" map:operation="SubscribeOp" map:portType="EventSource"/>
    <map:unsubscribe map:component="outUnsubscribeMsg" map:operation="UnsubscribeOp" map:portType="SubscriptionManager"/>
    <map:subscriptionEnd map:component="inSubscriptEndMsg" map:operation="SubscriptionEnd" map:portType="EventSource"/>
  </map:subscription>
  <map:subscription map:expiryDelta="10">
    <map:filter map:component="WindReportFilter2" map:expression="Speed=%Speed%"/>
    <map:notification map:component="inWindNotifMsg"/>
    <map:subscribe map:component="outSubscribeMsg2" map:operation="SubscribeOp" map:portType="EventSource"/>
    <map:unsubscribe map:component="outUnsubscribeMsg" map:operation="UnsubscribeOp" map:portType="SubscriptionManager"/>
    <map:subscriptionEnd map:component="inSubscriptEndMsg" map:operation="SubscriptionEnd" map:portType="EventSource"/>
  </map:subscription>
</map:wiclet>
```

What is claimed is:

1. A method for facilitating generation of a notification-based component application, the method comprising the steps of:

a) detecting a notification from at least one message;

b) creating notification operations in accordance with said detected notification;

c) constructing corresponding elements in accordance with said created notification operations; and d) creating a mapping document in accordance with said created notification operations for correlating the at least one message with its corresponding constructed elements, the mapping document for use at a gateway server to facilitate communication between the application and a corresponding backend server.

2. The method of claim 1, wherein the at least one message is defined by a WSDL document and the corresponding elements include components of the component application.

3. The method of claim 2, further comprising the step of providing a developer with a filter building page for constructing one or more notifications.

4. The method of claim 3, further comprising the step of automatically configuring the subscribe, unsubscribe and subscription-end operations of the notification constructed by the developer.

5. The method of claim 2, further comprising the steps of constructing additional components of the component application in accordance with a desired complexity of the component application.

6. The method of claim 1, wherein the at least one message is a message component in a component application and the corresponding elements include operations in a WSDL document.

7. A computer-readable medium for storing instruction which, when executed on a computing device, cause the computing device to implement the steps of:

a) detecting a notification from at least one message;

b) creating notification operations in accordance with said detected notification;

c) constructing corresponding elements in accordance with said created notification operations; and d) creating a mapping document in accordance with said created notification operations for correlating the at least one message with its corresponding constructed elements, the mapping document for use at a gateway server to facilitate communication between the application and a corresponding backend server.

8. The computer-readable medium of claim 7, wherein the at least one message is defined by a WSDL document and the corresponding elements include components of the component application.

9. The computer-readable medium of claim 8, comprising further instruction for providing a developer with a filter building page for constructing one or more notifications.

10. The computer-readable medium of claim 9, comprising further instructions for automatically configuring the subscribe, unsubscribe and subscription-end operations of the notification constructed by the developer.

11. The computer-readable medium of claim 8 comprising further instruction for constructing additional components of the component application in accordance with a desired complexity of the component application.

12. The computer-readable medium of claim 7, wherein the at least one message is a message component in a component application and the corresponding elements include operations in a WSDL document.

* * * * *

UNITED STATES PATENT AND TRADEMARK OFFICE
CERTIFICATE OF CORRECTION

PATENT NO. : 7,613,789 B2  
APPLICATION NO. : 11/405495  
DATED : November 3, 2009  
INVENTOR(S) : Cacenco et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this

Fourteenth Day of December, 2010

David J. Kappos  
*Director of the United States Patent and Trademark Office*